No. 820,124. PATENTED MAY 8, 1906.
W. T. NICHOLLS.
GLASS POT FURNACE AND POT AND METHOD OF MAKING THE SAME.
APPLICATION FILED JAN. 11, 1904.
2 SHEETS—SHEET 1.
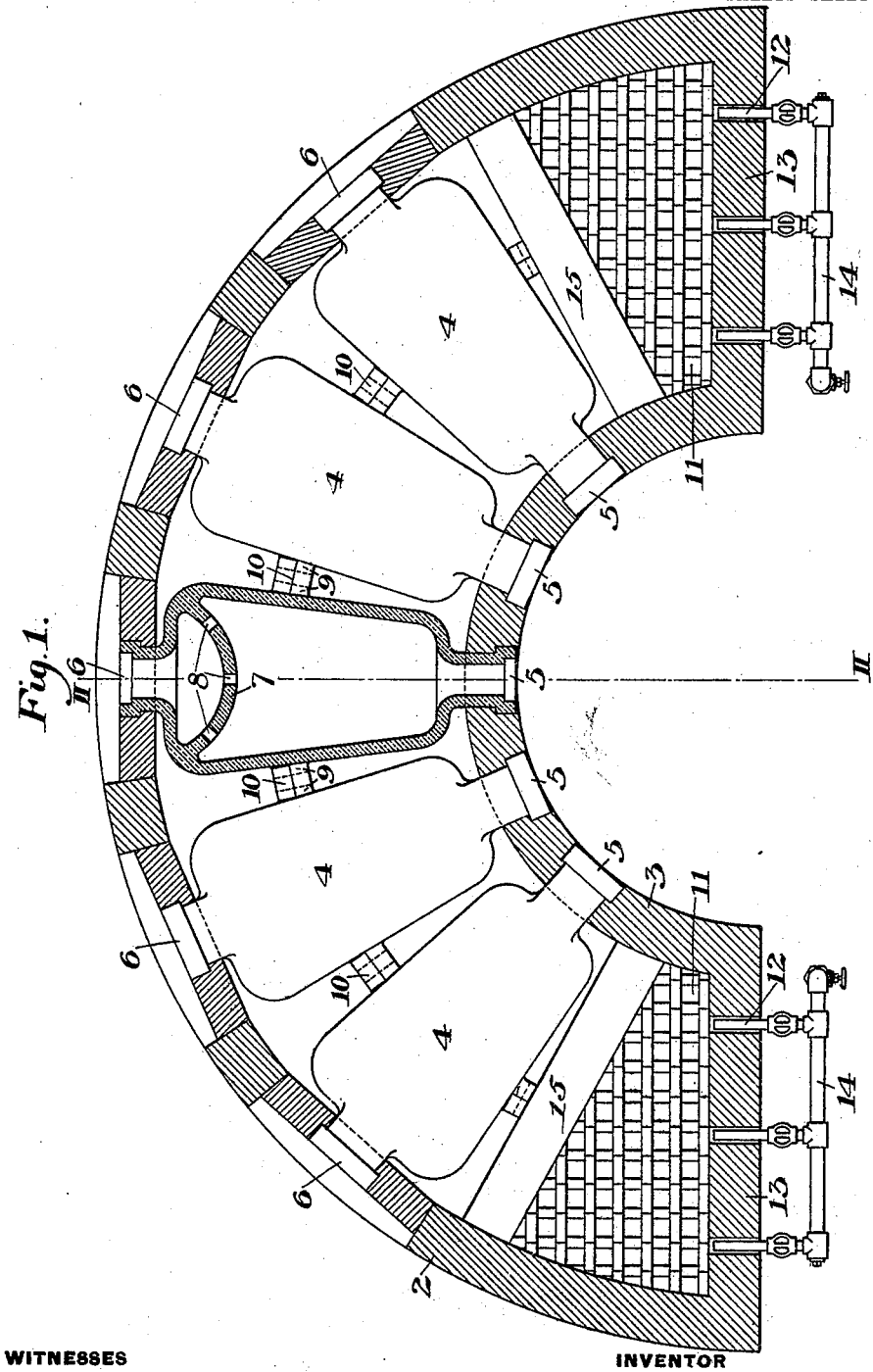
WITNESSES
INVENTOR No. 820,124. PATENTED MAY 8, 1906.
W. T. NICHOLLS.
GLASS POT FURNACE AND POT AND METHOD OF MAKING THE SAME.
APPLICATION FILED JAN. 11, 1904.
2 SHEETS—SHEET 2.
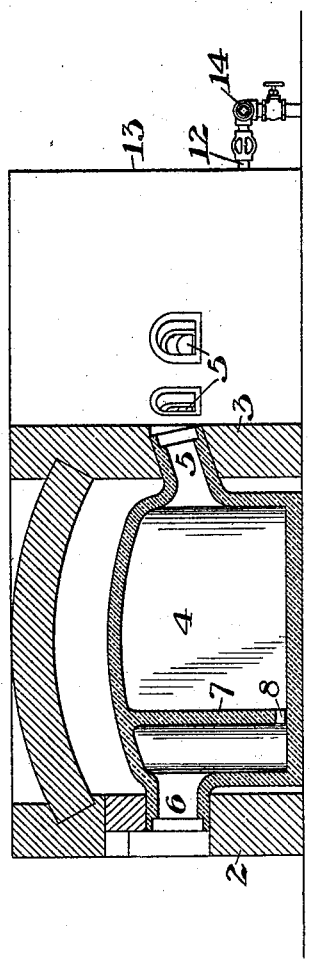
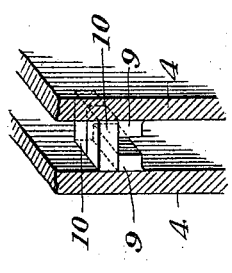
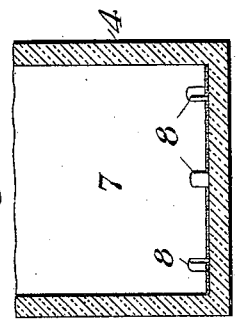
WITNESSES
INVENTOR
William T. Nicholls

UNITED STATES PATENT OFFICE.

WILLIAM T. NICHOLLS, OF WELLSBURG, WEST VIRGINIA.

GLASS-POT FURNACE AND POT AND METHOD OF MAKING THE SAME.

No. 820,124.      Specification of Letters Patent.      Patented May 8, 1906.

Application filed January 11, 1904. Serial No. 188,489.

*To all whom it may concern:*

Be it known that I, WILLIAM T. NICHOLLS, of Wellsburg, county of Brooke, West Virginia, have invented a new and useful Glass-Pot Furnace and Pots and Method of Making the Same, of which the following is a full, clear, and exact description, reference being had to the accompanying drawings, forming part of this specification, in which—

Figure 1 is a horizontal sectional view of my improved furnace with the top portion of one of the pots broken away. Fig. 2 is a vertical section on the line II II of Fig. 1. Fig. 3 is a detail section, on a larger scale, of the joint between the partition and the pot-bottom; and Fig. 4 is a detail view of the brace between the pots.

My invention relates to the class of pot-furnaces, and is designed to provide for economic use of the fuel by concentrating the heat upon the melting-chambers of double-chamber pots.

It is further designed to provide for continuous melting and working out by providing pots with openings at both ends, these openings leading into two different chambers.

In the drawings, 2 represents the outer curved wall, and 3 the inner curved wall, of a furnace of curved tunnel form. The pots 4 are set radially and transversely in the tunnel upon its bottom or a suitable shelf. Each pot has a closed top and outwardly-extending hollow necks 5 and 6 at its inner and outer ends, which necks extend through the side walls of the tunnel. The neck 5 serves for a feed-in opening for the batch and is preferably inclined upwardly and outwardly, while the neck 6 serves as a work-out opening through which the glass is taken for use.

I preferably provide each pot with a transverse partition 7, which extends from the top downwardly to near the bottom and is provided with bottom holes 8. This partition or shield is preferably of curved form, as shown in Fig. 1, to enlarge the melting-chamber. As will be seen, this partition extends transversely of the melting-pot and is much nearer to the work-out opening than it is to the feed-in opening, so that the major portion of the pot constitutes a melting-chamber of relatively large capacity sufficient to maintain the supply in the relatively smaller chamber at the opposite side of the partition with which the work-out opening communicates. This arrangement of the partition is of particular advantage in connection with the form of melting-pot shown, wherein the feed-in and work-out openings are at opposite ends thereof. In making the pot the material of the partition is not secured to or made integral with the pot-bottom, and in molding I preferably place a layer of sand between the lower edge of the partition and the bottom. This gives the important advantage of preventing cracking under heat, owing to the unequal expansion of the parts, which would occur if the partition were secured to the bottom.

To brace the pots in place, I preferably form each pot with a projecting refractory lug 9. The lugs of adjacent parts register, and upon them is dropped a spacing-brick 10, which fits between the pots and holds them in place.

I have shown the furnace as having air-regenerators 11 at its opposite ends, which may be reversed in the ordinary manner, and gaseous fuel is supplied through the burners 12, leading through holes in the end walls 13 and fed from a valve-controlled gas-pipe 14. The combustion-chambers above the regenerators communicate with the furnace-chamber through ports leading over end bridge-walls 15. The arrangement of the generators may, however, be varied widely, though the source of heat should always be at one end of the furnace and the outlet-port at the other end.

When the furnace is in operation, the flame and gases pass from one end of the tunnel around and over the pots and to the opposite end, and owing to the curved form they will short-circuit and pass mainly over the melting-chamber portions of the pots. This is of great advantage, since the melting-chamber should be at a high temperature, while the working-out chamber should be cooler. I thus concentrate the heat upon the inner portions of the pots and produce an economy in the fuel. It will also be noted that as compared with the ordinary circular pot-furnace the circular space inside the row of pots in such a furnace is cut out and the amount of fuel thereby reduced. In operating the furnace the batch material is fed at intervals into the inner ends of the pots and being melted therein rises in the work-out chamber, whence it is taken in the ordinary manner. The necks of the pots are inclosed in temporary walls built up around them between the piers of the furnace.

In addition to the advantage of economizing the heat and continuous working the curved form of the furnace gives plenty of room at the outer ends of the pots for the workmen.

Many changes may be made in the form and arrangement of the furnace, pots, the generators, &c., without departing from my invention.

I claim—

1. A pot-furnace in the form of a segment of an annulus having a row of pots set therein, and fuel inlet and outlet openings at opposite ends of the tunnel; substantially as described.

2. A pot-furnace in the form of a segment of an annulus having a series of substantially radial transverse pots set therein, said pots having work-out openings at the outer side of the tunnel, and fuel inlet and outlet openings at opposite ends of the tunnel; substantially as described.

3. A pot-furnace in the form of a segment of an annulus having a row of pots set therein and extending transversely of the furnace-chamber, each pot having a charging-opening leading through the inner side wall of the chamber, and a work-out opening leading through the opposite wall, and fuel inlet and outlet openings at opposite ends of the furnace-chamber; substantially as described.

4. A pot-furnace in the form of a segment of an annulus having a row of pots set transversely therein, each pot having an intermediate partition with a lower opening and feed-out openings leading through the inner side wall of the chamber and work-out openings leading through the outer side wall, and fuel inlet and outlet openings at opposite ends of the chamber; substantially as described.

5. The art of manufacturing partitioned glass-melting pots of refractory material, which comprises interposing a layer of foreign material between the bottom of the partition and the bottom of the pot, whereby the partition will substantially rest upon the pot-bottom, but will be separated therefrom; substantially as described.

6. The art of manufacturing partitioned glass-melting pots of refractory material, which comprises forming a portion of the partition with a curve transverse of its length and interposing a layer of foreign material between the bottom of the partition and the bottom of the pot to provide for differential contraction and drying between the partition and the walls of the pot; substantially as described.

7. A glass-melting pot provided with an integral partition which substantially seats against the bottom of the pot and extends upwardly therefrom, but which is entirely structurally disconnected from the bottom throughout its whole extent to allow for independent contraction and expansion of the partition and bottom; substantially as described.

8. A glass-melting pot, provided with an integral partition curved transversely of its horizontal length to provide for independent lateral expansion and contraction thereof, said partition resting upon the bottom of the pot, but entirely structurally separate from the bottom throughout its whole extent to allow for independent contraction and expansion of the partition and bottom; substantially as described.

9. In a glass-furnace, a melting-pot provided with an integral partition which extends upwardly from the bottom of the pot, but is not connected with the pot-bottom at any point, and which extends across the pot from wall to wall, said partition being curved transversely of its horizontal length the transverse curvature of said partition permitting contraction and expansion thereof independently of the lateral walls of the pot and its structural disconnection from the pot-bottom providing for independent expansion and contraction of the partition and bottom; substantially as described.

10. A glass-melting pot having a feed-in opening at one end, and a work-out opening at the opposite end, and a perforated partition arranged transversely of the work-out opening and nearer to said opening than to the feed-in opening; substantially as described.

11. A pot-furnace of tunnel form having transverse pots with closed tops, each pot having a feed-in opening at one side of the tunnel and a work-out opening at the opposite side and bracing projections between the sides of the pots; substantially as described.

12. In a pot-furnace, a pair of pots, each having a projection formed on one side and a brace between the pots coacting with the projections; substantially as described.

In testimony whereof I have hereunto set my hand.

WILLIAM T. NICHOLLS.

Witnesses:
W. H. COOK,
W. F. BARTH.